(12) United States Patent
Hall et al.

(10) Patent No.: US 9,051,419 B2
(45) Date of Patent: Jun. 9, 2015

(54) POLYMER

(76) Inventors: Richard H. Hall, Homer Township, Midland County, MI (US); Daniel F. Hall, Homer Township, Midland County, MI (US)

(*) Notice: Subject to any disclaimer, the term of this patent is extended or adjusted under 35 U.S.C. 154(b) by 1462 days.

(21) Appl. No.: 11/894,201

(22) Filed: Aug. 20, 2007

(65) Prior Publication Data

US 2008/0171814 A1    Jul. 17, 2008

Related U.S. Application Data

(63) Continuation-in-part of application No. 10/459,756, filed on Jun. 12, 2003, now abandoned.

(60) Provisional application No. 60/388,975, filed on Jun. 14, 2002.

(51) Int. Cl.
  *C10M 107/00* (2006.01)
  *C08G 61/02* (2006.01)

(52) U.S. Cl.
  CPC ..................................... *C08G 61/02* (2013.01)

(58) Field of Classification Search
  USPC ........................................................ 508/591
  See application file for complete search history.

(56) References Cited

U.S. PATENT DOCUMENTS

| | | | |
|---|---|---|---|
| 4,213,831 A | 7/1980 | Hall et al. | 203/86 |
| 4,880,553 A | 11/1989 | Kostusyk et al. | 508/588 |
| 4,956,120 A | 9/1990 | Commandeur et al. | 252/364 |
| 5,008,460 A | 4/1991 | Garwood et al. | 585/11 |
| 5,428,120 A | 6/1995 | Newman et al. | 526/160 |
| 5,545,355 A | 8/1996 | Commandeur et al. | 252/570 |
| 5,601,755 A | 2/1997 | Commandeur et al. | 252/570 |
| 6,071,864 A | 6/2000 | Hsi Ho et al. | 508/591 |
| 6,391,228 B1 | 5/2002 | Berger et al. | 252/570 |
| 6,491,809 B1 | 12/2002 | Briot et al. | 208/18 |
| 6,852,800 B2 | 2/2005 | Cruz et al. | 525/86 |
| 6,872,785 B2 | 3/2005 | Wang et al. | 525/313 |
| 6,939,922 B2 | 9/2005 | Beckley et al. | 525/329.7 |

OTHER PUBLICATIONS

Hairston, D. (Ed.), "The Nanosphere: A Brave New World," *Chemical Engineering*, pp. 27+, Feb. 2002 A.D.
Hall, R., Utility U.S. Appl. No. 10/459,756, filed Jun. 12, 2003 A.D.
Hall, R., U.S. Appl. No. 60/338,975, filed Jun. 14, 2002 A.D.
Port, O., et al., "Nano Technology," *Business Week*, pp. 181+, Spring 2002 A.D.
Baker, "Saving Energy by Fighting Friction," Business Week, pp. 67-68, Nov. 5, 2007.

*Primary Examiner* — Ellen McAvoy
(74) *Attorney, Agent, or Firm* — Christopher John Rudy

(57) ABSTRACT

An alpha-halocarbo aromatic monomer or comonomer and/or an allyl halide monomer or comonomer can be reacted with aluminum or an aluminum-containing catalyst to form a polymer.

6 Claims, No Drawings

POLYMER

This is a continuation-in-part of application Ser. No. 10/459,756 filed on Jun. 12, 2003 A.D. now abandoned, which claims benefits under 35 USC 119(e) of application No. 60/388,975 filed on Jun. 14, 2002 A.D., as does, in turn, the present continuation-in-part. The specifications of those applications are incorporated herein by reference.

FIELD AND PURVIEW OF THE INVENTION

In one aspect, the present invention concerns a polymer, which can be a residue of a reaction of an alpha-halocarbo aromatic monomer or comonomer without an ethenyl group directly on the aromatic ring (as some illustrations, benzyl chloride; benzyl bromide; ethyl benzyl chloride; dodecyl benzyl chloride; t-butyl benzyl chloride; m-chloromethyl naphthalene; 1-chloromethyl anthracene; 4,4'-bis-(chloromethyl)-1,1'-biphenyl) and/or an allyl halide monomer or comonomer (as an illustration methallyl chloride) and an aluminum or an alumina- or alumina-silica-containing catalyst—thus excluding a monomer with an ethenyl group directly on an aromatic ring such as vinyl benzyl chloride. The polymer, which may be made from one species of monomer or may be a copolymer, may serve as a nanoparticle lubricant, itself or added to a mineral oil base stock such as a light oil to a grease; or the polymer itself or in combination with other substance(s) may serve as a chromatography column packing, reinforcement for white rubber, plastic or concrete to include as a toughener or modulus increaser, a lightweight pigment for paper, a white opacifyer and brightener, a sunscreen, an identifying explosive marker, a catalyst support (e.g., when sintered) or a molecular sieve (e.g., when sintered), a reactive intermediate, and so forth and the like—which form foundations for other concerns.

BACKGROUND TO THE INVENTION

Among other things, lubrication of engine and other bearings is a most critical concern in today's industrialized society. It is becoming ever more important to improve upon existing technology.

Nanoparticles, in general, have become of increasing interest. See, e.g., Hairston, "The Nanosphere: A Brave New World," Chemical Engineering, page 27, February 2002. See also, Port et al., "Nano Technology," The Business Week, pages 181, 182 and 184, Spring 2002. Note, Baker, "Saving Energy by Fighting Friction," Business Week, pages 67-68, Nov. 5, 2007.

Hall et al., U.S. Pat. No. 4,213,831, discloses an aluminum container for processing vinylbenzyl chlorides. Other art is known: U.S. Pat. Nos. 4,880,553; 4,956,120; 5,008,460; 5,428,120; 5,545,355; 5,601,755; 6,071,864; 6,391,228; 6,491,809; 6,852,800; 6,872,785; and 6,939,922.

SUMMARY OF THE INVENTION

In general, the present invention provides a polymer, which can be prepared from reaction of an alpha-halocarbo aromatic monomer and aluminum or an aluminum-containing catalyst. The polymer may be provided as a nanoparticle and, among other things as noted elsewhere herein, can be a lubricant additive.

The invention is useful in lubricant, materials and chromatography technology, pigmentation, reinforcement, or as an optical additive, a versatile reactive intermediate, and so forth.

By the invention, a new lubricant additive and new lubricant are provided. By being formed either prior to employment as such or in situ, say, about the bearing-journal interface in a mineral oil matrix, with a ball-, plate- or needle-like structure, miniature ball, flake or needle bearings are provided. Thus, lubrication can be enhanced. As well, as an additive for materials such as rubber, plastic, or paper, those arts are improved with the lightweight (low density), opaque additive toughener, reactive intermediate; and the invention can be employed as a chromatography packing. As an organic material, it is compatible with hydrocarbon oils.

Numerous further advantages attend the invention.

ILLUSTRATIVE DETAIL OF THE INVENTION

The invention can be further understood by the present detail. The same is to be taken in an illustrative and not necessarily limiting sense.

The substance of most imminent concern is the residue of the reaction product of the alpha-halocarbo aromatic monomer and aluminum or an aluminum- or silica/alumina-containing catalyst, which, in general, is an organo-polymeric residue. It is noted that a silica/alumina-containing catalyst or catalytic substance is a notable type of an aluminum-containing catalyst or catalytic substance. For instance, the monomer may be a benzyl, diphenyl, naphthenyl or anthracenyl halide, which is contacted with aluminum or solid aluminum- or silica/alumina-containing catalytic substance such as alumina or aluminum silicate and heated to provide a solid oligomeric or polymeric product that may be insoluble in the monomer. The solid product is collected and employed as desired. Sonic and/or mechanical fragmentation of the solid can provide the nanoparticle(s).

The alpha-halocarbo aromatic monomer may be a monomer of the following general formula:

$$(CH2X)x\text{-}Q\text{-}(R)y \qquad (I)$$

wherein:
Q is an aromatic ring-containing structure or an ethenyl structure not attached to an aromatic ring having a halomethyl group;
R is independently at each occurrence an aliphatic, which preferably is alkyl, or an aromatic moiety, to include as a fused-ring substituent, or an inertly substituted variant thereof—advantageously a hydrocarbyl moiety having one to about one hundred carbons, desirably one to about twenty carbons;
X is a halo moiety—advantageously bromo or chloro, desirably chloro;
x is an integer from one to six, desirably one; and
y is an integer from zero to twenty, desirably zero to two; provided that "R" is not ethenyl when "y" is one or two; and preferably "R" is not ethenyl when "y" is one to five and/or "R" is not 1-methyl-ethenyl when "y" is one or two, or one to five.

Thus excluded as the preferred monomer would be the vinylbenzyl chloride and substituted vinyl benzyl chlorides of the mentioned patent to Hall et al., which are disclosed to be non-reactive with essentially pure aluminum and alloys having at least 90% by weight aluminum content. Vinyl benzyl chloride is excluded if the reaction product residue is not employed in combination with another substance such as a base stock in a lubricant, as an additive in materials such as rubber, plastic, or paper, or as a chromatographic column packing; or is not employed in methods such as lubricating, opacifying or chromatography as a packing. Examples of desirable monomers with "y" as zero include benzyl chloride, and with "y" as one, include o-, m- or p-version(s) of methyl benzyl chloride, ethyl benzyl chloride, propyl (to include n- and iso-) benzyl chloride, butyl (to include n-, iso-, sec-, and tert-butyl)benzyl chloride, hexyl (to include n-, iso-, sec-, cyclo-, and other isomers such as 1,1-dimethylbutyl, etc.) benzyl chloride, decyl (to include n-, etc.) benzyl chloride to include 1,1,2,2,3,3-hexamethylbutyl benzyl chloride, dodecyl benzyl chloride, eicosyl benzyl chloride, triacontanyl benzyl chloride, pentacontanyl benzyl chloride, hexacontanyl benzyl chloride, hectanyl benzyl chloride, long chain alpha-tert-carbo alkyl benzyl chloride, and phenyl benzyl chloride; o- or m-chloromethyl naphthalene, and 2-chloromethylanthracene. Examples of other monomers can include 4,4'-bis(chloromethyl)-1,1'-biphenyl and methallyl chloride. Other halides such as corresponding bromides may be employed to advantage. Solubilizing or suspensioning side chains are beneficially employed in the monomer to provide for a lubricant or other suitable additive.

The reaction may be run neat or with a diluent. Preferably, any diluent is inert. Examples of diluents include mineral oils.

The reaction may be controlled or quenched with water. Thus, one method of control of the reaction includes the addition of an inert gas, for example, nitrogen, in which is provided water, for example, as a vapor, to the system of the monomer and aluminum metal and/or other solid aluminum-containing substance.

Without wishing to be bound thereby, it is proposed that the product made from a monofunctional monomer (e.g., benzylchloride) may be a chain molecule formed through reaction of the active alpha-methylhalo moieties. As an illustration of the proposal, the product may be of the following general formula:

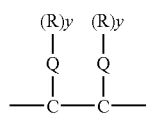

(II)

wherein "Q," "R" and "y" are as previously defined. It is proposed that aluminum trihalide may be produced as a byproduct.

Additional Teaching

The incorporation of many functional groups such as —OH, —NO2, —SO3H, —NH2, —NR2, —C═C into the starting halomethylaromatic is not possible. However, once the new polymeric is formed from the appropriate halomethyl aromatic and isolated, then such reactions to form the functional groups listed above can be conducted to give a new range of particles useful in products such as non-linear polymers, catalyst supports, polymers for biological indicators and carriers for drugs, and so forth. For instance, using the insoluble novel nanopolymer particles as the reactive base or foundation for known reactions such as halogenation, nitration, sulfonation, chloromethylation, amination, alkylation, and so forth, to form novel particles useful in bioanalytical applications, to include biological indication, for example, cancer, pregnancy, and so forth; chemical identification, for example, analysis of toxins; optical whitener; chromatography; pigments; and other unique applications of these designed particles of nanosize, can be carried out in the practice of the invention. Thus, a first, insoluble nanopolymer particle, which is an organo-polymeric residue of the reaction product of an alpha-halocarbo aromatic monomer and aluminum or aluminum-containing catalytic substance, can be a reactive base or foundation for a reaction, to include a known reaction, to incorporate a moiety into and form a second particle of nanosize.

The following examples further illustrate the invention:

EXAMPLE 1

An aliquot of benzyl chloride is added to a test tube, and a sliver of aluminum foil is added. Heat is applied to the test tube and its contents to nearly the boiling point of the monomer. A red spot develops on the foil from the general area of which a filamentous coil of solid product grows into the liquid with bubbling forming at the red spot, which is thought perhaps to be hydrogen chloride gas.

The product is insoluble in the hot monomer, brittle, opaque, and generally white in appearance. A sample of the solid product is heated on a spatula under a flame, and, at high temperature, it appears not to melt but at extreme heat to turn brown and to vaporize.

EXAMPLE 2

An aliquot of dodecyl benzyl chloride is reacted with aluminum as in Example 1. The solid product is a candidate for sonic fragmentation, dissolution in mineral oil and testing.

EXAMPLE 3

A mixture of benzyl chloride and dodecyl benzyl chloride is reacted with aluminum as in Example 1. A solid product results.

EXAMPLE 4

The procedure of Example 1, in general, is carried out in an inert oil diluent.

EXAMPLE 5

The procedure of Example 1 is carried out using benzyl bromide in place of benzyl chloride.

EXAMPLE 6

The procedure of Example 4 is carried out using benzyl bromide in place of benzyl chloride.

EXAMPLE 7

The procedure of Example 1 is carried out in dodecane solvent. The insoluble polymer formed is isolated and dried. The polymer is then suspended in hexane and chloromethylated—on the aromatic area of the polymer using chloromethyl ether. The newly chloromethylated polymer can be reacted with water to form a hydroxymethyl group on the polymer—or with trimethylamine to form a quaternary ammonium group on the polymer. Similar procedures—well known—can form many different functions on the novel nanoparticle base.

Further Additional Teaching

The present polymer may be employed as an insecticide or insect controller, pulverized, for example, into small if not nano-sized particles, which may clog pores of the target insect, and so forth; a toughener for plastics, which may act to arrest or inhibit crack propagation; an absorbent for bio-screening; and so forth and the like. Other uses are possible, in addition to the foregoing.

One feature of the present polymer, at least in certain embodiments, is that, unlike polymeric substances prepared from Friedel-Crafts reactions, it does not fluoresce blue or purple under ultraviolet light, or may do so at significantly reduced rates. Instead, the polymer may fluoresce white (e.g., from benzylchloride). This shows that its structure differs from such other polymeric substances.

Another peculiar feature is that the present polymer is generally insoluble in its own hot monomer, which is highly unusual to say the least.

Embodiments of the present polymer may not melt. Instead, they simply "burn away" at a very high temperature. It is believed that this not a sublimation per se.

Further examples follow:

EXAMPLE 8

The polymer or "unique" structure is insoluble and opaque in its own boiling monomer at 178 degrees C.

The heat-resistance of the "polymer" is such that it does not melt or soften. The initial homopolymer is brittle, which will make use of the polymer as pigment, submicron insecticide or as a toughening agent in plastics, rubbers, concrete, plasters, or inorganic materials, films, impact enhancement of other resins and materials or used to intercept fracture planes in other materials possibly. The low density compared to inorganic pigments such as titanium dioxide, calcium carbonate, clay, etc., will lower density and make for lighter paper, paints, films, coatings, sunscreens, etc., along with lower shipping costs possible. The use of the material as an identifying explosive marker could also be of use. The use of comonomers to give some flex in the polymer chain could toughen an otherwise brittle material. The use of a comonomer, which could enhance the ability of this type of unique polymer to graft or copolymerize with typical plastic systems, would be valuable. The ability to use different monomers would allow post reacting on the unique monomer. For example, Friedel-Crafts type reacstions on the benzene ring, or the naphthalene ring if alpha- or beta-naphthylbenzyl chloride is used, sulfonation or chlorosulfonation can give some water sensitivity or the formation of sulfonamides, etc.

An even more brittle material can be made with alpha, alpha'-dichloro-o-, m- and p-xylenes, 1,2- or 1,3- or 1,4-alpha,alpha'-dibromoxylenes, or p,'p-dichloromethylbiphenyl.

EXAMPLE 9

10 g of 4-ethylbenzyl chloride was heated in a tube with aluminum foil as before. The polymer formed on heating had an off-white color, and opaque and insoluble in its own hot monomer.

This sample was made to show that a linear alkyl group on the polymer did not affect opacity or solubility. The ethyl group also allows chemical reactions on this polymer through the alkyl group.

EXAMPLE 10

20 g of 1-chloroethylnaphthalene (90% with 10% 2-isomer) was placed in a tube and heated as in other examples. This material was rather thick and viscous compared to other examples and brown in color. It is possible a good high vacuum distillation could have lightened this color.

A polymer was formed on the aluminum, but it did not in this case make tendrils but rather dark uneven blobs where the reaction took place. The reaction was cooled, and the polymer stored wet with acetone. This polymer has two aromatic rings for further chemical reaction such as nitration, sulfonation, amination, etc.

EXAMPLE 11

9 g of benzylchloride and 1 g of naphthylchloride (90% 1-isomer/10% 2-isomer) was heated in a tube with aluminum foil. The color of the liquid was a light tan. When heated as before, the polymer tendrils formed at the aluminum and extended into the liquid. As before, the major portion of unreacted liquid was filtered off using a coarse glass frit. The polymer was washed with acetone, and stored wet as a light yellow opaque insoluble polymer. The color was much lighter than the all-naphthyl chloromethyl polymer.

EXAMPLE 12

Methallylchloride when heated to the boiling with aluminum foil does develop a fine stream of bubbles with an insoluble polymer tendril growing into the liquid—essentially straight. This is different from the vinylbenzyl chloride as described in U.S. Pat. No. 4,213,831. The polymer growth is slower but offers the optio of copolymerization with benzylchloride to leave a residual double bond on the involved polymer formed.

A mixture of 9 g of benzylchloride with 1 g of methallylchloride was heated with aluminum foil, and polymer tendrils formed. Since both individual monomers form polymer, it is assumed that a copolymer was formed.

EXAMPLE 13

9 g of benzylchloride was mixed with 1 g of methallylchloride ((1-chloro-1-methyl)propene) and heated as before. It is known that vinylbenzylchloride inhibits the reaction of benzylchloride with aluminum, and this experiment was to check if methallylchloride would do the same. The heating to get polymer took additional time reaching a temperature that seemed to almost boil the mixture (possibly the methallylchloride), but the reaction did start, and the polymer tendrils that formed were off-white and opaque and insoluble in hot monomer. Cooling slowed the reaction, but removal of the aluminum was necessary to stop it. The polymer was stored wet with acetone. This experiment was also run to possibly make a polymer with a residual double bond for later grafting a vinyl monomer thereon.

EXAMPLE 14

2-Ethylhexanol-1 is dehydrated over alumina or silica gel in the vapor phase. The olefin formed is used to alkylate toluene, giving

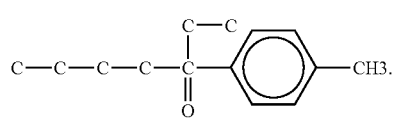

The olefin used can be made from different oxo-alcohols up to an eicosyl moiety. Diisobutylene, triisobutylene, tri- and tetrapropylene will alkylate toluene. The methyl group on the aromatic ring can then be chlorinated by known methods using chlorine and UV light. The halomethyl thus formed will polymerize on aluminum as benzylchloride does, giving a polymer with bulky oil-sensitive groups.

EXAMPLE 15

9 g of 4-methylethylpentylbenzylchloride is mixed with 9 g of benzylchloride and polymerized with aluminum foil as in other examples. The polymer is insoluble and opaque in its own monomer. The polymer has an oil (aliphatic) sensitive group for a lubrication additive.

EXAMPLE 16

10 g of 4-tetrapropylbenzylchloride is mixed with 10 g of benzylchloride and polymerized with aluminum foil. This copolymer contains a very bulky aliphatic group for use as a lubrication additive. The polymer is opaque and insoluble in its own hot monomer.

EXAMPLE 17

4,4'-bischloromethylbiphenyl with a melting point of 126 degrees C. presented problems using the neat material. To avoid this, because of its skin-sentizing characteristics, it was dissolved in benzylchloride. Initially only one concentration was used (~10%) this should make the benzylchloro polymer even more brittle and change the polymer architecture. A 50% concentration of 4,4'-bischloromethylbiphenyl in benzylchloride would form a highly crosslinked polymer capable of fracture into extremely small particles on ultrasonication. This would be similar to the alpha,alpha'-bischloromethylethylxylenes previously made:

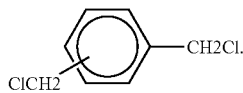

EXAMPLE 18

9 g of benzylchloride was mixed with 1 g of 4,4'(bischloromethyl)-1-biphenyl. A small piece of aluminum foil was added to a ½"×10" glass tube on a ring stand. The liquid was then heated with a propane torch until there was a small stream of tiny bubbles coming from the edge of the aluminum foil. Upon judiciously slow heating, tendrils of opaque insoluble polymer, initiated at this and other sites, grow into the liquid, some up to an inch long. As the reaction accelerated, a water bath was placed around the tube, and the room-temperature water slowed the polymer formation rapidly. At the site of polymer initiation of this and other examples, a red dot or red line was visible. Again, the reaction started with bubbles and making more polymer. When the polymer began to crowd the liquid free space, the reaction was cooled to room temperature, which stopped the polymer growth.

The reaction mixture was poured into a tube with a coarse glass frit, and unreacted (slightly colored) liquid was filtered off and stored for more reaction or clean-up and recycle. The aluminum strip was withdrawn with tweezers and discarded. The polymer remaining was rinsed with acetone and then transferred to a labeled bottle wet with acetone for further processing. The polymer was a pale yellow, opaque and insoluble in hot monomer.

This experiment was designed to prove sure polymer cross-linking due to the bifunctional compound.

EXAMPLE 19

10 g of benzylchloride and 10 g of 4-t-butylbenzylbromide were mixed and treated exactly like the previous example. The polymer formed was a pale yellow opaque material insoluble in its hot monomer.

After the acetone wash, the polymer was bottled and stored.

This experiment was designed to show chloromethyl and bromomethyl groups react in a similar way. The polymer has a very bulky t-butyl group, which is aliphatic and occupies with four carbons the equivalent space of the aromatic ring with a methyl group. This material and others with similar structure are going to be more compatible with aliphatic materials such as motor oils and other lubricants that a more aromatic material. For example, polystyrene is not completely soluble in oil, but poly-t-butylstyrene is completely soluble. Such oil sensitivity is of great value combined with a small particle size to fit between close-mating bearings and gear surfaces while preventing oil run out on long standing. Much of the wear on modern bearings occurs at the start after a shut down. The oil runs out of the space between surfaces, and it is not renewed until oil pressure is again applied. This material is designed to minimize or stop cold start wear prolonging engine or gear wear.

EXAMPLE 20

Fine organic particles from ultrasonically processed benzylchloride polymer are mixed with silica gel, alumina gel, mixed silica-alumina gel, and cured to a solid. Upon firing at high temperature, the organic particles will burn off and leave holes or voids with very high surface area, which are catalytically active. The type of halomethyl composition from those listed will leave differently shaped micro voids to allow selective catalysts to be prepared.

EXAMPLE 21

The fine organic particles initially as from Example 20 are also fired in a Nitrogen or Argon atmosphere to become essentially all carbon with an aromatic carbon type structure. This architecture can also be made catalytic by normal carbon activation methods such as partial oxidation, nitration, sulfonation, halogenation, etc.

The essentially pure carbon particles can be used in a high compression anvil type machine under heat and high pressure to make diamonds. Again, the ability to make varying architectures from different monomers will allow different and possibly more regular structure that will be harder or more fracture resistant than diamonds made from graphite or other carbon forms.

EXAMPLE 22

The fine organic particles initially as from Example 20 can be mixed with molten plastics such as thermoplastics either in melt on a two-roll mill or mixed into the feed of a screw injection molding machine. The particles serve to interrupt fracture planes in the cooled rigid plastic, providing toughness and enhanced elongation. The advantage of these organic particles is the lack of moisture sensitivity when using calcium carbonate, alumina, glass, clay or any inorganic particle. The ability of a plastic to bond with an organic surface compared to an inorganic surface is much more favorable.

To test this we took a polystyrene in solvent, i.e., model airplane glue, and laid down strips on a silicone-coated cookie sheet. We also made a mix of the same glue with our benzochloride polymer particles. The heat polystyrene broke easily on bending, but the sample containing the polymer particles bent back and forth many times before breaking. The brittle nature of the polystryene was definitely improved.

EXAMPLE 23

The addition of the organic particles initially as from Example 20 to a liquid resin such as polyester, novolac, epoxy, polyurethane, etc., again offers crack plane interruption, resulting in tougher, more bendable resin products. This also enhances the bonding of such resins to fiber reinforcements such as glass, carbon or organic fibers such as Nomex (Reg. U.S. Pat. & Tm. Off.), Kevlar (Reg. U.S. Pat. & Tm. Off.), high tensile polyolefin fibers, and other high strength reinforcements. Interruption of the fracture plane with a "bonded" micro particle will enhance the strength of the cured resin/fiber mix.

EXAMPLE 24

The use of such organic micro particles can serve to make uniform voids in high strength ceramic plates used in armor vests or vehicle protection systems.

EXAMPLE 25

The use of microparticles in rubbers is also well known. The use of carbon black in tread stock for tires gives superior wear and better hysteresis temperature control as well as enhanced elongation. The light color of these particles will allow colored pigments and dyes to make rubber other than black with an organic particle instead of titanium dioxide, calcium carbonate, diatomaceous earth, or clays. The bonding of the rubber or solution to an organic particle of benzylchloride polymer is undoubtedly greater than the bonding to an inorganic solid such as clay, calcium carbonate, silica, etc.

EXAMPLE 26

The polymer from the described benzylchloride polymer using aluminum foil was dried and ultrasonicated in water. The pale yellow powder (since when promptly separated from benzylchloride the polymer is white but when left in benzylchloride overnight it picks up a yellow color) was dried on a watch glass and scraped into a pile for the following experiments:

A. The benzyl polymer was stirred into a glue of polystyrene in toluene and compared to the neat glue. Strips were laid down on a siliconized cookie sheet and dried. The neat glue strip broke easily with little bending effort. The strip containing the benzyl polymer was opaque and bent almost double, showing that the fine particles increased toughness, probably by interrupting crack formation, and also made the sample opaque.

B. The same type of comparison was made with rubber cement. The neat rubber cement on drying elongated easily and broke quickly. The benzyl polymer made the rubber cement opaque, and, on stretching, the rubber elongated considerably and without breaking and even stayed in an elongated stretched state. Again, the benzyl polymer had an effect of toughening and interrupting fracture planes in the rubber.

C. A two-part epoxy resin system was mixed in two samples. One just the epoxy and hardener. The second sample was mixed, and the benzyl polymer powder was mixed in. The sample with the benzyl polymer was opaque and had a much higher modulus (much more rigid) than the unmodified resin. The sample with the benzyl polymer could be bent with much more effort, but it was tough and did not break.

D. Using the finely divided benzyl polymer, which is water insoluble and water insensitive, with a lighter oil from WD-40 to gear oil gives a water insensitive greas-like material. This grease is very useful in U-joints, differantials, constant velocity joints, ball joints, and units exposed to atmosphere or salt water, particularly if a protective rubber sleeve or boot is compromised. As a bolt, i.e., thread, lubricant additive, the benzyl polymer offers the same water-insensitivity while minimizing run off. A drop of 20W-50 motor oil on a glass slide is easily tilted, and the oil droplet runs. A drop of oil with the benzyl polymer is opaque but does not run. This is the best indication of use in lubrication in either gears or bearings to prevent dry surfaces, which would have excessive wear or scoring on starts or especially delayed starts.

EXAMPLE 27

A small amount of rust (ferric oxide) was added to benzylchloride in a tube, which was then heated. A colored material formed, which soon went out of control generating a gas, probably hydrogen chloride, and foaming to the top of the tube and out the top in a foamed solid. This material was dark colored and looked almost purple in sunlight or black light. The rigid foam that formed showed sighs of retraction or melting in direct flame, but did not ignite even in the thin bubbles. This is obviously an entirely different polymer than that formed with the aluminum metal.

In contrast, the polymer formed from benzylchloride and aluminum foil, when dried, is white. Sunlight or black light still showed a white color, and not the purple black color evident in the ferric oxide catalyzed material above.

EXAMPLE 28

An inclined plane made of an aluminum sheet was constructed using a 10"×4" piece with a height of ~4" on one end. Two metal pieces ("A" and "B") made of 1¼"×1¼"×⅛" steel were glued together in four-piece laminates using Instant Gel glue. The bottom surface on each was polished, on first a 400-grit emery cloth and then a 600-grit emery cloth. A fine dusting of the benzyl polymer on one piece was rubbed off using a paper towel. The untreated piece did not slide down the inclined plane. The treated piece did slide to the bottom. Piece A weighed 90.3 g while piece B weighed 90.9 g. Switching pieces after cleaning them and the plate with toluene gave the same results with dry polymer powder. The dry polymer treated sample slid down the plane at a lower angle than the untreaded, polished sample.

CONCLUSION TO THE INVENTION

The present invention is thus provided. Various feature(s), part(s), step(s), subcombination(s) and combination(s) can be employed with or without reference to various other feature(s), part(s), step(s), subcombination(s) and combination(s) in the practice of the invention, and numerous adaptations and modifications can be effected within its spirit, the literal claim scope of which is particularly pointed out as follows.

What is claimed is:

1. A composition of matter, which comprises a substance made from a foundation polymer subjected to a subsequent reaction, characterized in that:
   the foundation polymer:
      is an organo-polymeric substance;
      includes a chain molecule structure, optionally which may be a branched, crosslinked and/or ladder structure;
      has the same structure as that which is, and thus it can be, a residue of a reaction product of an alpha-halocarbo aromatic monomer or comonomer and/or an allyl halide monomer or comonomer contacted with aluminum or an aluminum-containing catalytic substance, wherein the monomer excludes a vinyl benzyl chloride;
      further has the following properties:
         under ultraviolet light, it does not substantially fluoresce blue or purple but may fluoresce white;
         it is generally insoluble in its own hot, boiling monomer; and
         it does not melt, soften, nor sublime per se, rather simply burning away at a very high temperature; and
   the subsequent reaction is selected from the group consisting of:
      halogenation, nitration, sulfonation, chloromethylation, amination, alkylation, and a combination thereof, such that a polymeric product derived from the foundation polymer is provided, which has a functional group incorporated into the foundation polymer from the subsequent reaction;
      mixing the foundation polymer with silica gel, alumina gel or mixed silica-alumina gel, curing to a solid, and then firing at a high temperature so as to burn off organic particles and leave holes or voids with very high surface area;
      firing in a Nitrogen and/or Argon atmosphere so as to make the foundation polymer become essentially all Carbon—optionally activating the latter by partial oxidation, nitration, sulfonation and/or halogenation, or optionally subjecting to heat and high pressure to make diamond; and
      a combination thereof.

2. The composition of claim 1, wherein the alpha-halocarbo monomer or comonomer is of the following general formula:

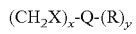

wherein:
   "Q" is an aromatic ring containing structure or an ethenyl structure not attached to an aromatic ring having a halomethyl group;
   "R" is independently at each occurrence an aliphatic moiety, an aromatic moiety, or an inertly substituted variant thereof;
   "X" is a halo moiety;
   "x" is an integer from one to six; and
   "y" is in integer from zero to twenty;
   provided that "R" is not ethenyl when "y" is one or two; and/or "R" is not 1-methyl-ethenyl when "y" is one to five.

3. The composition of claim 2, wherein "R" is a hydrocarbyl moiety having one to about one hundred carbons; "X" is bromo or chloro; "x" is one; "y" is zero or one; and said polymer is of the following general formula:

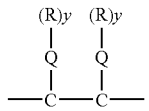

wherein "Q," "R" and "y" are as previously defined.

4. The composition of claim 1, which is a nanoparticle.

5. The composition of claim 2, which is a nanoparticle.

6. The composition of claim 3, wherein the subsequent reaction is selected from the group consisting of halogenation, nitration, sulfonation, amination, alkylation, and a combination thereof; and the resulting product is then subject to a further subsequent reaction including chloromethylation such that a polymeric product is provided, which has a functional group incorporated therein from the further subsequent reaction including chloromethylation.

* * * * *